US012756192B2

(12) United States Patent
Chen et al.

(10) Patent No.: US 12,756,192 B2
(45) Date of Patent: Oct. 6, 2026

(54) POWER SWITCHING SYSTEM

(71) Applicant: DELTA ELECTRONICS, INC., Taoyuan City (TW)

(72) Inventors: Hsin-Chih Chen, Taoyuan City (TW); Meng-Jiang Tsai, Taoyuan City (TW); Chao-Li Kao, Taoyuan City (TW); Yi-Ping Hsieh, Taoyuan City (TW); Hung-Chieh Lin, Taoyuan City (TW)

(73) Assignee: DELTA ELECTRONICS, INC., Taoyuan City (TW)

( * ) Notice: Subject to any disclaimer, the term of this patent is extended or adjusted under 35 U.S.C. 154(b) by 0 days.

(21) Appl. No.: 19/233,552

(22) Filed: Jun. 10, 2025

(65) Prior Publication Data

US 2025/0385518 A1 Dec. 18, 2025

(30) Foreign Application Priority Data

Jun. 18, 2024 (TW) ................................ 113122478

(51) Int. Cl.
*H02J 3/0073* (2026.01)
*H02H 9/00* (2006.01)
*H02J 3/1878* (2026.01)

(52) U.S. Cl.
CPC ........... *H02J 3/0073* (2020.01); *H02H 9/002* (2013.01); *H02J 3/1878* (2013.01)

(58) Field of Classification Search
CPC ........ H02J 3/0073; H02J 3/1878; H02H 9/00; H02H 9/002
See application file for complete search history.

(56) References Cited

U.S. PATENT DOCUMENTS 6,560,128 B1 5/2003 Rajda et al.
7,459,804 B2 12/2008 Marwali et al.
(Continued)

FOREIGN PATENT DOCUMENTS

CN 1918769 A 2/2007
CN 101689770 A 3/2010
(Continued)

OTHER PUBLICATIONS

Po-Tai Cheng et al: "An In-rush Current Suppression Technique for the Solid-State Transfer Switch System", Fourth Power Conversion Conference, Apr. 2-5, 2007, Nagoya, Japan, IEEE, Piscataway, NJ, USA, Apr. 1, 2007 (Apr. 1, 2007), pp. 1698-1705, XP031178691, ISBN: 978-1-4244-0843-6 (Year: 2007).*
(Continued)

*Primary Examiner* — Robert L Deberadinis
(74) *Attorney, Agent, or Firm* — MUNCY, GEISSLER, OLDS & LOWE, P.C.

(57) ABSTRACT

A power switching system includes a first power supply and a second power supply with three-phase AC power. The power switching system further includes a first power switch assembly, a second power switch assembly, and a three-phase transformer. The three-phase transformer includes a first winding, a second winding, and a third winding. The first winding, the second winding, and the third winding are connected in a delta structure to form three common nodes. A first common node is connected to a first switch and a fourth switch, a second common node is connected to a second switch and a fifth switch, and the third common node is connected to a third switch and a sixth switch.

18 Claims, 7 Drawing Sheets

(56) References Cited

U.S. PATENT DOCUMENTS

| | | | |
|---|---|---|---|
| 2005/0184591 | A1 | 8/2005 | Marwali et al. |
| 2005/0184592 | A1 | 8/2005 | Marwali et al. |
| 2008/0265679 | A1 | 10/2008 | Shenoy et al. |
| 2015/0002059 | A1 | 1/2015 | Liu et al. |
| 2015/0002067 | A1 | 1/2015 | Nondahl et al. |
| 2024/0063656 | A1 | 2/2024 | Liao et al. |

FOREIGN PATENT DOCUMENTS

| | | | | | |
|---|---|---|---|---|---|
| CN | 104253572 | A | | 12/2014 | |
| CN | 204271658 | U | | 4/2015 | |
| CN | 205544314 | U | | 8/2016 | |
| CN | 109787347 | A | | 5/2019 | |
| CN | 112653229 | A | | 4/2021 | |
| CN | 117595479 | A | | 2/2024 | |
| EP | 4325692 | A1 | * | 2/2024 | .............. H02J 9/068 |

OTHER PUBLICATIONS

Po-Tai Cheng et al: "An In-rush Current Suppression Technique for the Solid-State Transfer Switch System", Fourth Power Conversion Conference, Apr. 2-5, 2007, Nagoya, Japan, IEEE, Piscataway, NJ, USA, Apr. 1, 2007 (Apr. 1, 2007), pp. 1698-1705, XP031178691, ISBN: 978-1-4244-0843-6Y, Sections II and III; figures 1, 6, 8.

Search Report dated Sep. 23, 2025 of the corresponding European patent application No. 25181841.5.

Search Report dated Mar. 17, 2025 of the corresponding PCT patent application No. PCT/CN2024/099783.

* cited by examiner

POWER SWITCHING SYSTEM

BACKGROUND

Technical Field

The present disclosure relates to a power switching system, and more particularly to a power switching system with a forced commutation procedure.

Description of Related Art

The statements in this section merely provide background information related to the present disclosure and do not necessarily constitute prior art.

A static transfer switch (STS) device is an essential component in the data center power system configuration. It can provide uninterrupted power supply to loads such as critical equipment, and it usually contains multiple silicon-controlled rectifiers. STS devices are usually supplied power by multiple independent power supplies and automatically switched from the preferred (primary) power supply to the backup power supply once the preferred (primary) power supply exceeds the acceptable range. Therefore, it is to provide uninterruptible power to critical equipment to avoid power supply interruption to critical equipment causing forced shutdown of critical equipment.

Typically, the output of a static transfer switch (STS) device is connected to critical equipment through a transformer. Since the transformer is an inductive device, when the accumulated magnetic flux is too high, there will be a problem of magnetic flux saturation. Therefore, if the primary power supply exceeds the acceptable range, and improper switching between the two power supplies may cause high inrush currents in the downstream transformer. When the surge current is too high, it can overload the upstream circuit or trip the circuit breaker, causing the entire system to lose power. Therefore, the conventional power switching method is to wait for an appropriate time before turning on the silicon-controlled rectifier of the backup power supply after the current flowing through the silicon-controlled rectifier of the primary power supply drops to zero to avoid excessive surge current. However, this switching method requires waiting for the current to drop to zero and additional waiting for the appropriate time to switch. As a result, the waiting time is too long and the output voltage is too low, which may still lead to the risk of critical equipment being forced to shut down.

Therefore, how to design a power switching system to provide a forced commutation procedure to solve the problems and technical bottlenecks in the existing technology has become a critical topic in this field.

SUMMARY

In order to solve the problems above, the present disclosure provides a power switching system. The power switching system includes a first power supply and a second power supply with three-phase AC power. The power switching system includes a first power switch assembly, a second power switch assembly, and a three-phase transformer. The first power switch assembly includes a first switch, a second switch, and a third switch, sequentially connected to a first phase, a second phase, and a third phase of the first power supply. The second power switch assembly includes a fourth switch, a fifth switch, and a sixth switch, sequentially connected to a first phase, a second phase, and a third phase of the second power supply. The three-phase transformer includes a first winding, a second winding, and a third winding, wherein the first winding, the second winding, and the third winding of the three-phase transformer are connected in a delta structure to form three common nodes, wherein a first common node is connected to the first switch and the fourth switch, a second common node is connected to the second switch and the fifth switch, and a third common node is connected to the third switch and the sixth switch. The power switching system provides a forced commutation procedure for switching the first power supply to the second power supply, comprising: turning off the first switch, the second switch, and the third switch connected to the first power supply, detecting magnetic flux of the first winding, the second winding, and the third winding, and selecting one winding with the fastest flux switching as a fastest flux switching winding, turning on two of the fourth switch, the fifth switch, and the sixth switch connected to the fastest flux switching winding, and turning on the remaining one of the fourth switch, the fifth switch, and the sixth switch.

In order to solve the problems above, the present disclosure provides a power switching system. The power switching system includes a first power supply and a second power supply with three-phase AC power. The power switching system includes a first power switch assembly, a second power switch assembly, and a three-phase transformer. The first power switch assembly includes a first switch, a second switch, and a third switch, sequentially connected to a first phase, a second phase, and a third phase of the first power supply. The second power switch assembly includes a fourth switch, a fifth switch, and a sixth switch, sequentially connected to a first phase, a second phase, and a third phase of the second power supply. The three-phase transformer includes a first winding, a second winding, and a third winding, wherein the first winding, the second winding, and the third winding of the three-phase transformer are connected in a wye structure to form one common node and three nodes, and the common node is grounded, wherein a first node is connected to the first switch and the fourth switch, a second node is connected to the second switch and the fifth switch, and a third node is connected to the third switch and the sixth switch. The power switching system provides a forced commutation procedure for switching the first power supply to the second power supply, comprising: turning off the first switch, the second switch, and the third switch connected to the first power supply, detecting magnetic flux of the first winding, the second winding, and the third winding, and selecting one winding with the fastest flux switching as a fastest flux switching winding, turning on one of the fourth switch, the fifth switch, and the sixth switch connected to the fastest flux switching winding, and turning on the remaining two of the fourth switch, the fifth switch, and the sixth switch.

It is to be understood that both the foregoing general description and the following detailed description are exemplary, and are intended to provide further explanation of the present disclosure as claimed. Other advantages and features of the present disclosure will be apparent from the following description, drawings, and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1:
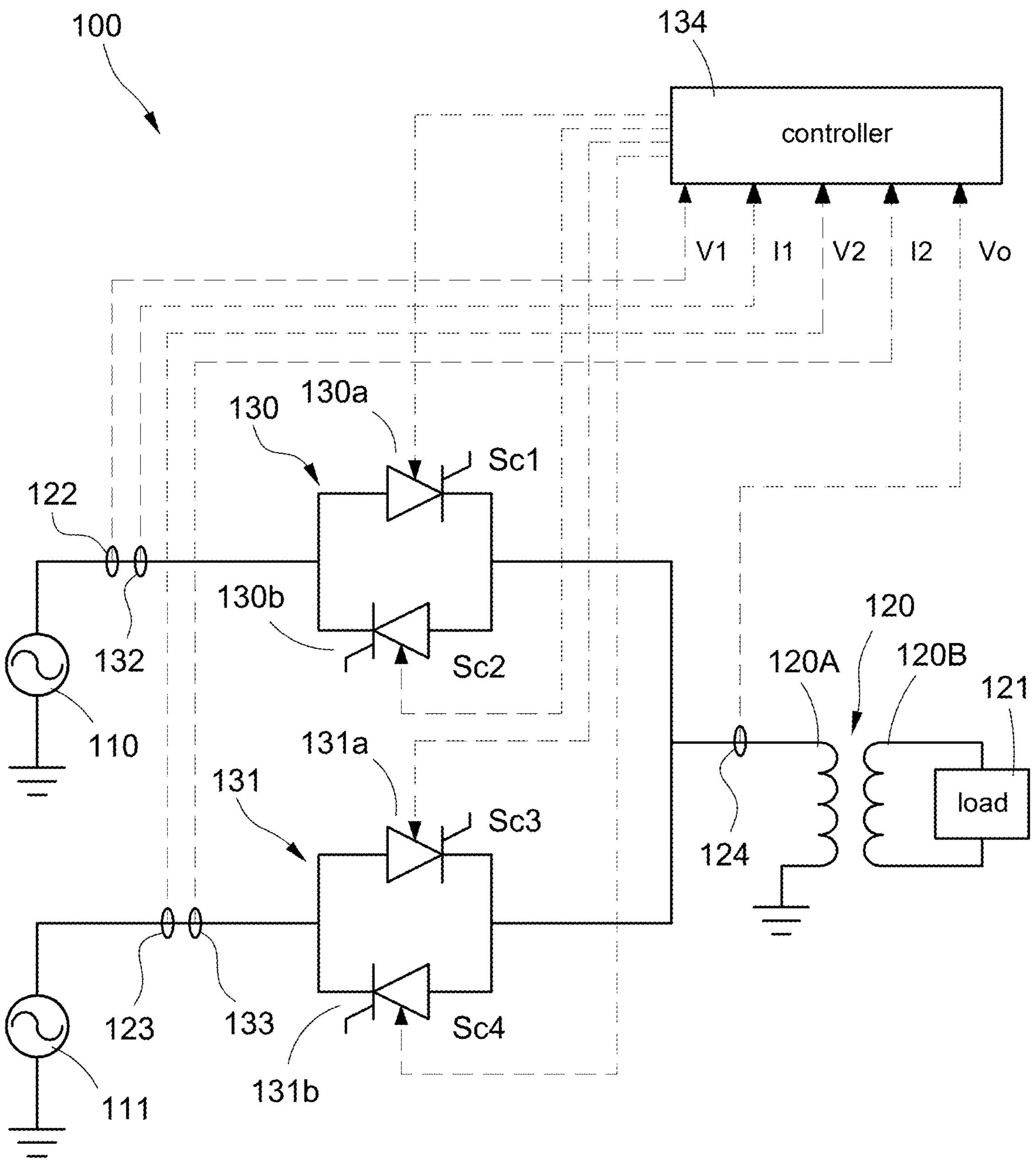
FIG. 1 is a block circuit diagram of a power switching system according to the present disclosure.

Reference will now be made to the drawing figures to describe the present disclosure in detail. It will be understood that the drawing figures and exemplified embodiments of present disclosure are not limited to the details thereof.

Please refer to FIG. 1, which shows a block circuit diagram of a power switching system according to the present disclosure. The power switching system 100 mainly supplies power to a load 121, such as the critical equipment, and the power switching system 100 includes two static transfer switch devices 130, 131, an inductive device 120, and a controller 134. The two static transfer switch devices 130, 131 include a first static transfer switch 130 and a second static transfer switch 131. The load 121 may preferably be, for example, but not limited to, a critical load that requires uninterrupted and continuous operation such as a server, communication system, etc., but is not limited to this.

An input side of the first static transfer switch 130 is coupled to a first power supply 110, and an input side of the second static transfer switch 131 is coupled to a second power supply 111. An output side of the first static transfer switch 130 and an output side of the second static transfer switch 131 are connected to a common node. The inductive device 120, such as, but not limited to a transformer, includes a first side winding 120A and a second side winding 120B. The first side winding 120A is coupled to the first static transfer switch 130 and the second static transfer switch 131 at the common node, and the second side winding 120B is coupled to the load 121.

The controller 134 detects powers of the first power supply 110 and the second power supply 111 to collect power information of the first power supply 110 and the second power supply 111 in real time. Moreover, the controller 134 detects an output power received by the inductive device 120 from the first static transfer switch 130 and the second static transfer switch 131 so as to adjust and control the first static transfer switch 130 and the second static transfer switch 131. In particular, the controller 134 selects the first power supply 110 or the second power supply 111 to supply power to the load 121 coupled to the inductive device 120 by controlling the first static transfer switch 130 and the second static transfer switch 131. In one embodiment, the controller 134 may be a digital signal processor (DSP), but it is not limited to this, that is, all physical circuits that can use signals to control circuits, control devices having control software, etc. should be included in the scope of this embodiment.

Specifically, the power switching system 100 further includes voltage sensors 122, 123, 124 and current sensors 132, 133. The voltage sensors 122, 123, 124 include a first voltage sensor 122, a second voltage sensor 123, and a third voltage sensor 124. The first voltage sensor 122 and the second voltage sensor 123 are respectively coupled to the first power supply 110 and the second power supply 111 for respectively detecting a first voltage signal V1 corresponding to the first power supply 110 and a second voltage signal V2 corresponding to the second power supply 111. The current sensors 132, 133 include a first current sensor 132 and a second current sensor 133. The first current sensor 132 and the second current sensor 133 are respectively coupled to the first power supply 110 and the second power supply 111 for respectively detecting a first current signal I1 corresponding to the first power supply 110 and a second current signal 12 corresponding to the second power supply 111 to acquire powers of the first power supply 110 and the second power supply 111. In addition, the third voltage sensor 124 is coupled to the first side winding 120A (shown in FIG. 1) or the second side winding 120B (not shown) of the inductive device 120 for detecting a third voltage signal Vo corresponding to the first side winding 120A or the second side winding 120B. Therefore, the voltage signals and the current signals detected by the voltage sensors 122, 123, 124 and the current sensors 132, 133 are transmitted to the controller 134 for the controller 134 to perform control operations.

Figure 2:
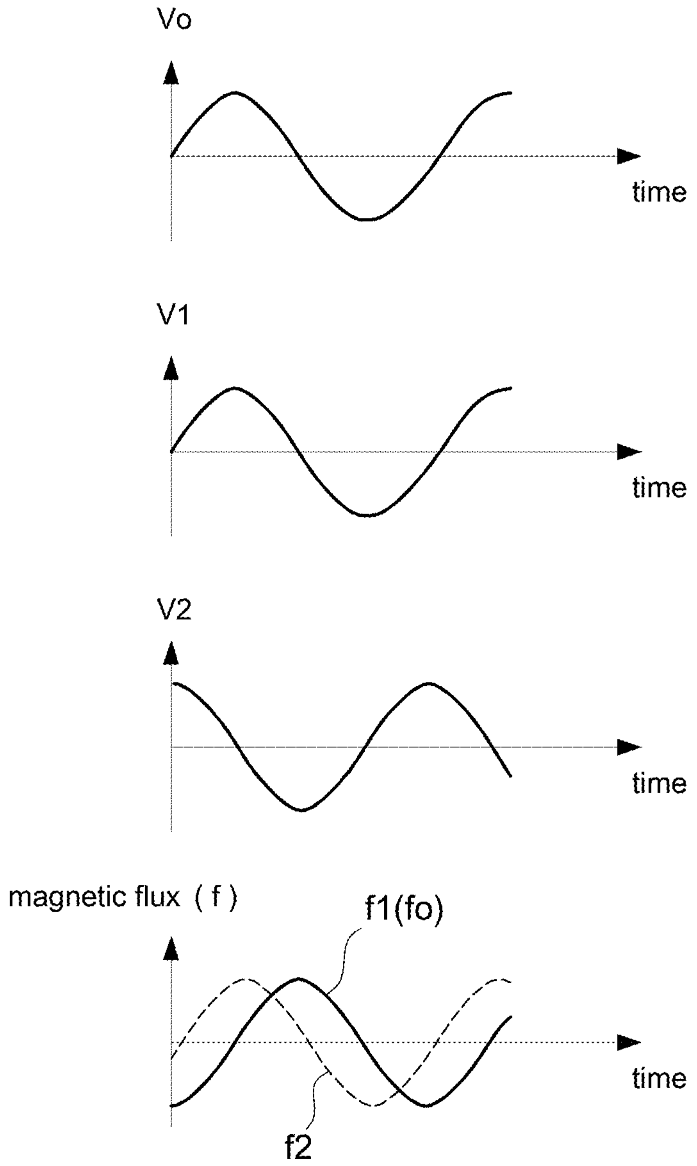
FIG. 2 is schematic waveforms of a main power supply, a backup power supply, and an output supply according to the present disclosure.

Please refer to FIG. 2, which show schematic waveforms of a main power supply, a backup power supply, and an output supply according to the present disclosure. Although the voltage waveforms of the first power supply 110 and the second power supply 111 have a phase difference, this is only for illustration and they are not related to each other. That is, the switching control method of the present disclosure mainly controls the magnetic flux, regardless of the size of the phase difference. The controller 134 acquires the first voltage signal V1, the second voltage signal V2, and the third voltage signal Vo and integrates the first voltage signal V1, the second voltage signal V2, and the third voltage signal Vo to acquire magnetic fluxes f1, f2 corresponding to the first power supply 110 and the second power supply 111, and a magnetic flux fo on the inductive device 120. In particular, the first magnetic flux f1 is the integral of the first voltage signal V1, the second magnetic flux f2 is the integral of the second voltage signal V2, and the third magnetic flux fo is the integral of the third voltage signal Vo. In particular, since the first static transfer switch 130 is turned on so that the first power supply 110 is connected to the inductive device 120, the first magnetic flux f1 is consistent with the third magnetic flux fo. In particular, since the integral of the voltage is the magnetic flux, and the integral of the sinusoidal wave is still a sine wave, that is, the first magnetic flux f1, the second magnetic flux f2, and the third magnetic flux fo (i.e., an expected magnetic flux) are still sine waves.

Please refer to FIG. 1 again, each of the first static transfer switch 130 and the second static transfer switch 131 includes a plurality of silicon-controlled rectifiers (SCRs). The first static transfer switch 130 includes a first thyristor 130*a* and a second thyristor 130*b*, and the two thyristors 130*a*, 130*b* are working thyristors during positive and negative half-cycle operation respectively, and are connected in anti-parallel to each other. For example, an anode of the first thyristor 130*a* is connected to a cathode of the second thyristor 130*b*, and a cathode of the first thyristor 130*a* is connected to an anode of the second thyristor 130*b*. The second static transfer switch 131 includes a third thyristor 131*a* and a fourth thyristor 131*b*, and the two thyristors 131*a*, 131*b* are working thyristors during positive and negative half-cycle operation respectively, and are connected in anti-parallel to each other. For example, an anode of the third thyristor 131*a* is connected to a cathode of the fourth thyristor 131*b*, and a cathode of the third thyristor 131*a* is connected to an anode of the fourth thyristor 131*b*. In particular, the above-mentioned thyristors 130*a* to the fourth thyristor 131*b* may preferably be silicon-controlled rectifiers, but are not limited thereto.

Moreover, the controller 134 generates a plurality of independent control signals Sc1-Sc4 to respectively control the first thyristor 130*a* to the fourth thyristor 131*b*. Specifically, a first control signal Sc1 controls a gate of the first thyristor 130*a*, a second control signal Sc2 controls a gate of the second thyristor 130*b*, a third control signal Sc3 controls a gate of the third thyristor 131*a*, and a fourth control signal Sc4 controls a gate of the fourth thyristor 131*b*. In addition, an anode and a cathode of the first thyristor 130*a* and an anode and a cathode of the third thyristor 131*a* are arranged in the same direction, and an anode and a cathode of the second thyristor 130*b* and an anode and a cathode of the fourth thyristor 131*b* are arranged in the same direction. Therefore, a forward-biased direction of the first thyristor 130*a* is identical to a forward-biased direction of the fourth thyristor 131*b*, and a forward-biased direction of the second thyristor 130*b* is identical to a forward-biased direction of the third thyristor 131*a*.

Due to the characteristics of the thyristors 130*a* to 131*b* when current flows through the thyristors 130*a* to 131*b*, the controller 134 cannot turn off the thyristors 130*a* to 131*b* through the gates. Therefore, the thyristors 130*a* to 131*b* will be turned off only after the thyristors 130*a* to 131*b* naturally freewheel to zero or use forced commutation technology to cancel the anode current.

Specifically, the controller 134 selectively controls the first thyristor 130*a*, the second thyristor 130*b*, the third thyristor 131*a*, and the fourth thyristor 131*b* according to the first power supply 110 or the second power supply 111 being as a power-supplying source. In particular, the controller 134 can be used to continuously calculate and capture the first magnetic flux f1, the second magnetic flux f2, and the third magnetic flux fo in the first power supply 110, the second power supply 111, and the inductive device 120 (such as, but not limited to, inductive components such as transformers) in real time. If a power failure event occurs (for example, but not limited to, an abnormality occurs in the first power supply 110), the controller 134 respectively provides the first control signal S1*l* and the second control signal Sc2 to turn off the first thyristor 130*a* and the second thyristor 130*b* on working paths of the first power supply 110.

Afterward, according to the magnetic fluxes calculated based on the detected first voltage signal V1, the second voltage signal V2, and the third voltage signal Vo and the specific operation mode, the third control signal Sc3 and the fourth control signal Sc4 are respectively provided to turn on the third thyristor 131*a* and the fourth thyristor 131*b* on backup paths (i.e., related to the second power supply 111) so as to not only avoid improper switching between the two power supplies, causing high inrush current in the downstream inductive device 120, but also avoid waiting for the freewheeling of the silicon-controlled rectifier to reach zero, causing the output power to drop too low, which is not sufficient to maintain the stable operation of the load 121. In particular, according to the specific operation mode designed in the present disclosure, the third control signal Sc3 and the fourth control signal Sc4 can be provided in segments to respectively turn on the third thyristor 131*a* and the fourth thyristor 131*b* (that is, only one of the thyristors 131*a*, 131*b* is turned on during a certain period of commutation). Moreover, the controller 134 can detect a first current (i.e., the first current signal I1) flowing through the first static transfer switch 130 by the first current sensor 132 to determine whether the first static transfer switch 130 is turned on or turned off. That is, the controller 134 can confirm whether the first static transfer switch 130 is correctly turned on and turned off through the first current (i.e., the first current signal I1) to confirm whether the entire power switching system 100 normally operates. Moreover, the controller 134 can simply determine whether the first thyristor 130*a* and the second thyristor 130*b* are correctly turned on and turned off by detecting voltages across two ends of the first thyristor 130*a* and the second thyristor 130*b* (through the first voltage signal V1 and the third voltage signal Vo). Similarly, the controller 134 can detect a second current (i.e., the second current signal 12) flowing through the second static transfer switch 131 by the second current sensor 133 to determine whether the second static transfer switch 131 is turned on or turned off. That is, the controller 134 can confirm whether the second static transfer switch 131 is correctly turned on and turned off through the second current (i.e., the second current signal 12) to confirm whether the entire power switching system 100 normally operates. Moreover, the controller 134 can simply determine whether the third thyristor 131*a* and the fourth thyristor 130*b* are correctly turned on and turned off by detecting voltages across two ends of the third thyristor 131*a* and the fourth thyristor 131*b* (through the second voltage signal V2 and the third voltage signal Vo).

Figure 3:
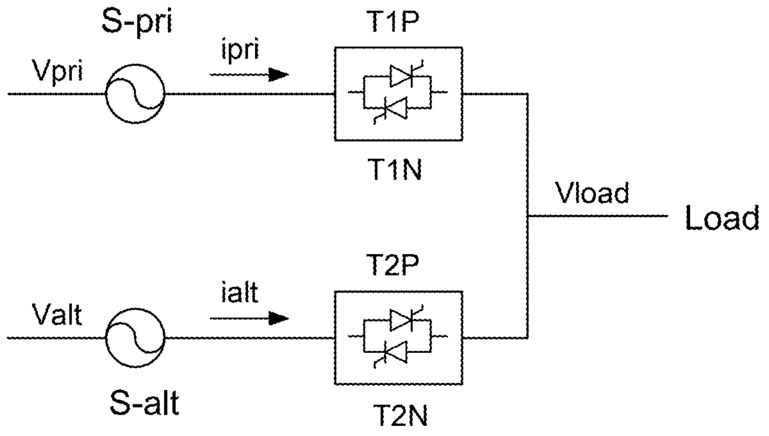
FIG. 3 is a schematic diagram of a forced commutation of the power switching system according to the present disclosure.
Figure 4:
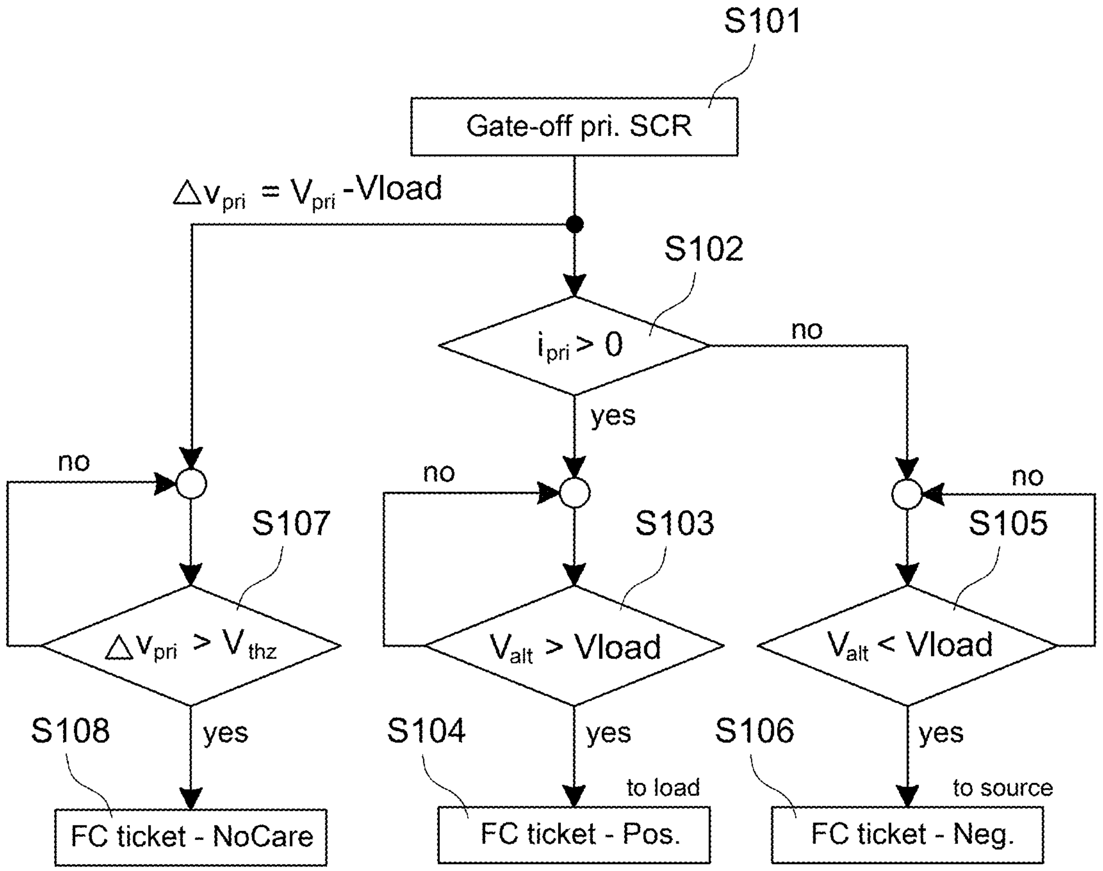
FIG. 4 is a flowchart of a method of the forced commutation of the power switching system according to the present disclosure.

Please refer to FIG. 3, which shows a schematic diagram of a forced commutation of the power switching system according to the present disclosure. In order to avoid simultaneous power supply or short circuit between two power supplies S-pri, S-alt, the controller 134 provides a forced commutation mechanism. Different from the existing natural commutation manner, the present disclosure provides a control method with forced commutation. Please refer to FIG. 4, which shows a flowchart of a method of the forced commutation of the power switching system according to the present disclosure. The allowance of the forced commutation mechanism means that an opportunity to the forced commutation is allowable, which is represented by tickets. When an abnormal event occurs in a main power supply S-pri, the controller 134 first turns off all the thyristors connected to the main power supply S-pri, that is the thyristors T1P, T1N are turned off (step S101). As mentioned above, due to the characteristics of the thyristor, not all the thyristors TIP, TIN can be completely turned off through the gate control.

Afterward, the controller 134 determines whether a current ipri of the main power supply S-pri is greater than zero (step S102). If the current ipri is greater than zero, it means that the thyristor TIP has not been completely turned off. In this condition, the thyristor T1P is in a turned-on state. Afterward, the controller 134 determines whether a voltage Valt of a backup power supply S-alt is greater than a load voltage Vload (step S103). If the voltage Valt is greater than the load voltage Vload, the controller 134 turns on the thyristor T2P so that the voltage Valt reversely excites the thyristor T1P, and turns off the thyristor T1P (positive switch) that is still turned on by the reverse voltage. This is to allow forced commutation of the positive switch, that is, to acquire a ticket (FC ticket-Pos) for forced commutation of the positive switch (step S104).

On the contrary, in the determination of step S102, if the current ipri of the main power supply S-pri is less than zero, it means that the thyristor T1N has not been completely turned off. In this condition, the thyristor T1N is in a turned-on state. Afterward, the controller 134 determines whether the voltage Valt of the backup power supply S-alt is less than the load voltage Vload (step S105). If the voltage Valt is less than the load voltage Vload, the thyristor T2N is turned on so that the current change effect can force the thyristor T1N (negative switch) that is still turned on to turn off. This is to allow forced commutation of the negative switch, that is, to acquire a ticket (FC ticket-Neg) for forced commutation of the negative switch (step S106).

Incidentally, when acquiring (once or multiple times) the ticket for the forced commutation of the positive switch, that is, when the forced commutation of the positive switch is allowed, or when acquiring (once or multiple times) the ticket for the forced commutation of the negative switch, that is, when the forced commutation of the negative switch is allowed, it is not necessarily necessary to perform the forced commutation immediately since it is possible that the current forced commutation effect is not ideal. The reason is that the magnetic flux offset may be too large due to the introduction of forced commutation. Preferably, the timing for forced commutation introduction can be determined based on considerations such as magnetic flux switching speed, magnetic flux size, etc., which will be described later.

In addition, if the forced commutation is not introduced due to consideration of magnetic flux switching speed, magnetic flux size, etc. (even if there are conditions for forced commutation of the positive switch and/or the negative switch, since the current of the originally turned-on thyristor naturally freewheels to zero, it is turned off due to natural commutation. Hence, a voltage difference ΔVpri exists between the voltage Valt and the load voltage Vload. Therefore, the controller 134 determines whether the voltage difference ΔVpri is greater than a voltage threshold Vthz (step S107). If the voltage difference ΔVpri is greater than the voltage threshold Vthz, it means that the thyristors connected to the main power supply S-pri, i.e., the thyristors T1P, T1N have been turned off. Therefore, a ticket (FC ticket-NoCare) for turning on the turned-off negative switch or the turned-off positive switch is acquired (step S108). In this condition, no matter which thyristor is turned on, it will not cause a short circuit abnormality between the main power supply S-pri and the backup power supply S-alt.

Figure 5:
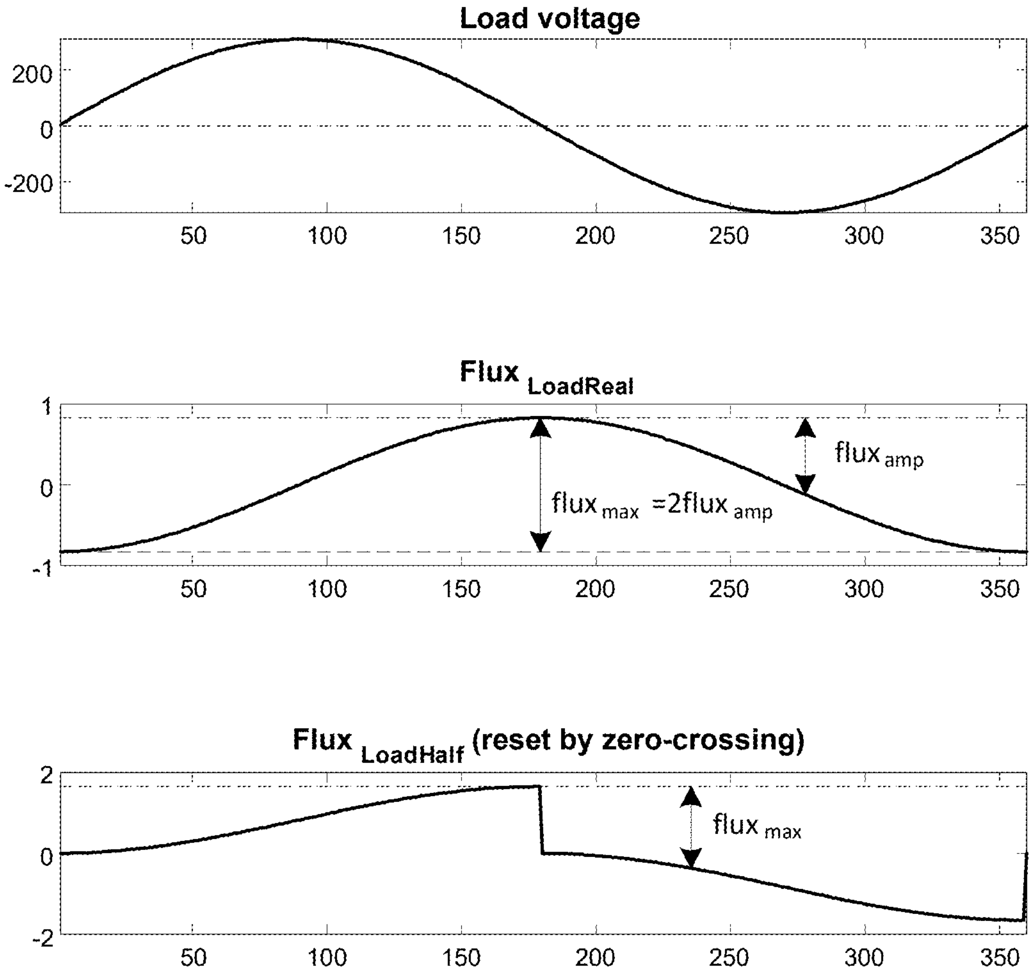
FIG. 5 is schematic waveforms of voltage and magnetic flux of the forced commutation of the power switching system according to the present disclosure.

The determination of the timing for the introduction of forced commutation will be explained as follow, that is, the timing of using the forced commutation ticket. Please refer to FIG. 5, which shows schematic waveforms of voltage and magnetic flux of the forced commutation of the power switching system according to the present disclosure.

Since the load voltage is in the form of a sinusoidal wave (as shown in the upper waveform of FIG. 5), the magnetic flux is also in the form of a sinusoidal wave:

$$\phi_{amp} = \sqrt{2}\,V_{rms}/(2\pi \cdot f_L) \quad \text{(formula 1)}$$

Since the magnetic flux is a fixed sinusoidal wave, the amount of excitation generated by the magnetic flux during the sinusoidal wave period can be estimated, that is, the integral of the voltage (as shown in the middle waveform of FIG. 5) can be acquired.

Since the amount of excitation generated by the magnetic flux can be estimated, as long as the excitation magnitude of the voltage is calculated during the period when the thyristor is not turned on, how much magnetic flux excitation can be inferred when the thyristor is turned on. Therefore, using this method, the timing for the introduction of forced commutation can be determined based on the current load voltage and the amount of magnetic flux excitation that can be inferred. In other words, when the switch is turned on and the accumulated amount of the excitation does not exceed the saturation magnetic flux, the forced commutation of the thyristor can be introduced.

On the contrary, when the switch is turned on and the accumulated amount of the excitation may exceed the saturation magnetic flux, it is to wait for timing to introduce the forced commutation of thyristor. Until the accumulated amount of excitation does not exceed the saturation magnetic flux, the forced commutation of the thyristor will be introduced.

Specifically, the conditions of the polarity of the magnetic flux offset and the polarity of the voltage are further considered. One condition is when the polarity of the magnetic flux offset is the same as the polarity of the voltage, for example, when the voltage is a positive half cycle and the magnetic flux is positive, the timing can be selected to introduce the forced commutation of the thyristor. In other words, when the accumulated amount of excitation is too large, it is to wait. On the contrary, when the accumulated amount of excitation is not yet too large, the forced commutation of the thyristor can be introduced since the magnetic flux saturation does not occur.

Another condition is when the polarity of the magnetic flux offset is not the same as the polarity of the voltage, such as when a power failure occurs during the negative half cycle, thus generating excitation for the negative half cycle and being able to provide demagnetization during the positive half cycle, thereby making the magnetic flux saturation less likely to occur. Under the demagnetization, it is the best way to introduce forced commutation of thyristor as soon as possible. Therefore, as long as the controller 134 determines that the polarity of the magnetic flux offset is different from the polarity of the voltage and does not cause magnetic flux saturation, the forced commutation of the thyristor can be immediately introduced. The above-mentioned descriptions can be achieved through the following formulas.

$$\phi_{Load\_past} += v_{Load} \cdot T_{calc} \quad \text{(formula 2)}$$

$$\phi_{future} = \phi_{max} - \phi_{altLoad\_past} \ \text{or} \ -\phi_{max} - \phi_{altLoad+past} \quad \text{(formula 3)}$$

$$k_{flux} = \operatorname{sgn}(\phi_{LoadReal} \cdot \phi_{future}) \quad \text{(formula 4)}$$

In particular, according to formula 2, the accumulated magnetic flux offset of the load can be calculated. According to formula 3, the magnetic flux that can be acquired in the future can be calculated, and the maximum magnetic flux and the minimum magnetic flux in the future can be acquired (as shown in the lower waveform of FIG. 5) to determine whether the saturation magnetic flux is exceeded. According to formula 4, the polarity of the future magnetic flux and the current magnetic flux can be determined. As mentioned above, if the polarity of the magnetic flux offset is the same as the polarity of the voltage, is to wait for appropriate timing to introduce the forced commutation of thyristor. On the contrary, if the polarity of the magnetic flux offset is different from the polarity of the voltage, the forced commutation of thyristor can be introduced under looser conditions.

Figure 6:
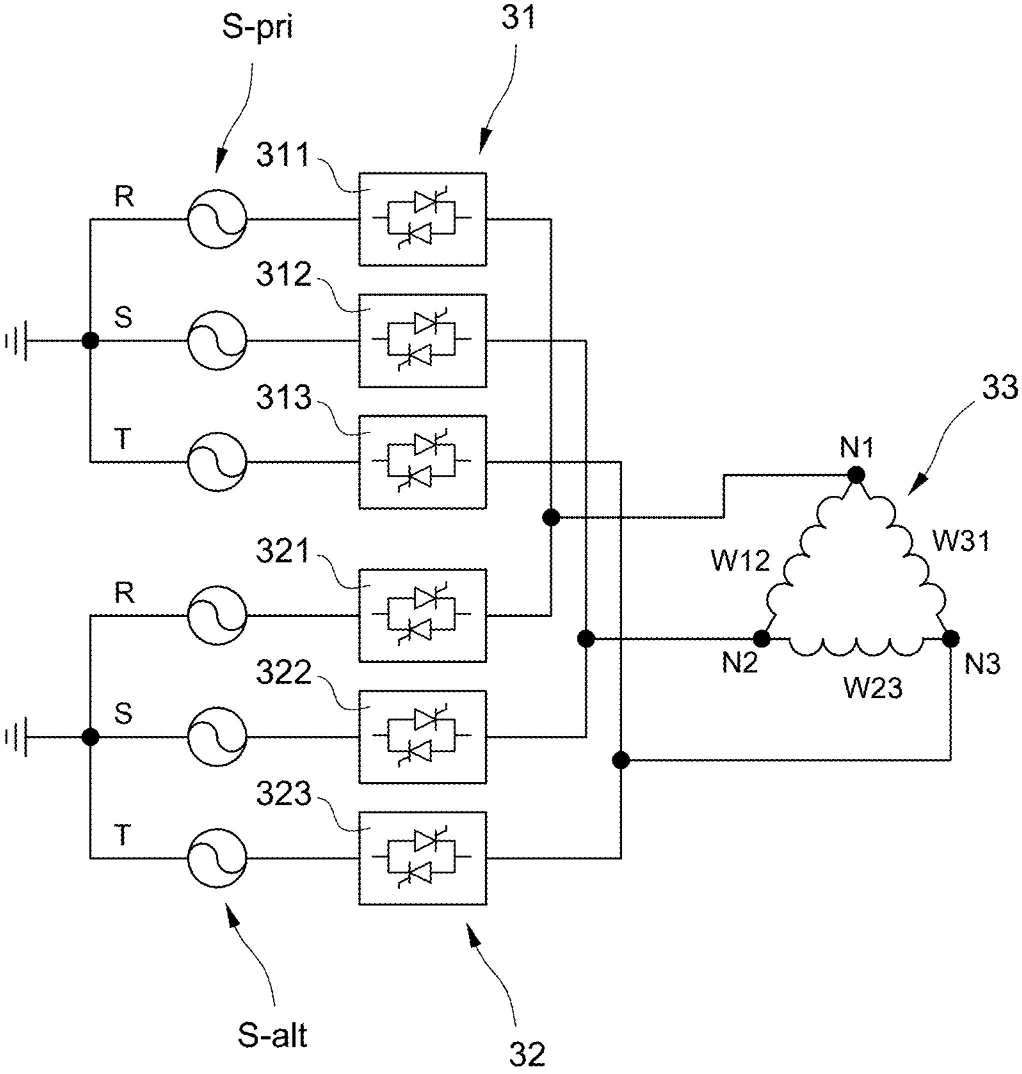
FIG. 6 is a block circuit diagram of a three-phase three-wire power switching system according to the present disclosure.

Regarding how to apply the forced commutation of magnetic flux, voltage and thyristor in a three-phase power system, more specific control of thyristor will be explained later. Please refer to FIG. 6, which shows a block circuit diagram of a three-phase three-wire power switching system according to the present disclosure. In FIG. 6, two power supplies, including a main power supply S-pri and a backup power supply S-alt respectively provide three-phase static transfer switch devices 31, 32, and are then connected to the downstream three-phase transformer 33.

As shown in FIG. 6, the three-phase power switching system includes a first power supply S-pri having three-phase AC power and a second power supply S-alt having three-phase AC power. The power switching system includes a first power switch assembly 31 and a second power switch assembly 32. The first power switch assembly 31 includes a first switch 311, a second switch 312, and a third switch 313 sequentially connected to a first phase (R phase), a second phase (S phase), and a third phase (T phase) of the first power supply S-pri. The second power switch assembly 32 includes a fourth switch 321, a fifth switch 322, and a sixth switch 323 sequentially connected to a first phase (R phase), a second phase (S phase), and a third phase (T phase) of the second power supply S-alt.

The three-phase transformer 33 includes a first winding W12, a second winding W23, and a third winding W31. In particular, the first winding W12, the second winding W23, and the third winding W31 of the three-phase transformer 33 are connected in a delta structure to form three common nodes N1, N2, N3. In particular, a first common node N1 is connected to the first switch 311 and the fourth switch 321, a second common node N2 is connected to the second switch 312 and the fifth switch 322, and a third common node N3 is connected to the third switch 313 and the sixth switch 323.

Incidentally, for the three-phase three-wire system, there are common problems: 1. over-excitation problem; 2. invalid excitation problem.

Regarding the over-citation problem, since one part of the windings of the three-phase transformer 33 is powered by the main power supply S-pri, while the other part of the windings is powered by the backup power supply S-alt, for a certain winding, it may be powered by the main power supply S-pri and the backup power supply S-alt simultaneously. In this condition, if a phase difference between the main power supply S-pri and the backup power supply S-alt is floating, in the worst case, the winding may withstand twice the rated voltage, thus causing insulation damage of the three-phase transformer 33 or saturation of the three-phase transformer 33 to generate a surge current.

Regarding the invalid excitation problem, when the forced commutation timing is determined by the above-mentioned magnetic flux calculation, and when the forced commutation is introduced, if only one thyristor is turned on, there will be no current path to flow back. Therefore, such conduction of the thyristor is invalid and has no effect on the excitation and demagnetization of the three-phase transformer 33.

Therefore, in order to avoid the problems of the over-excitation and the invalid excitation, the design of the present disclosure can effectively achieve a technical solution for successful switching between the two power supplies. When an abnormal event occurs in the main power supply S-pri, all thyristors connected to the main power supply S-pri are first turned off by controlling the gates of the thyristors. Afterward, an allowance (a ticket) of the forced commutation is acquired, and thyristors of two phases are simultaneously turned on to avoid invalid excitation. Afterward, wait for half a cycle, for example, if it is a positive half cycle, the remaining thyristors of two phases in a next negative half cycle to complete the conduction of four thyristors of two phases.

The timing of the conduction of the thyristors of the last phase is determined based on whether magnetic flux saturation will occur after the calculated future magnetic flux is added. If magnetic flux saturation occurs, it is to wait for the opportunity to conduct. If magnetic flux saturation does not occur, the conduction of two thyristors of the remaining phase will be completed in sequence.

Figure 8:
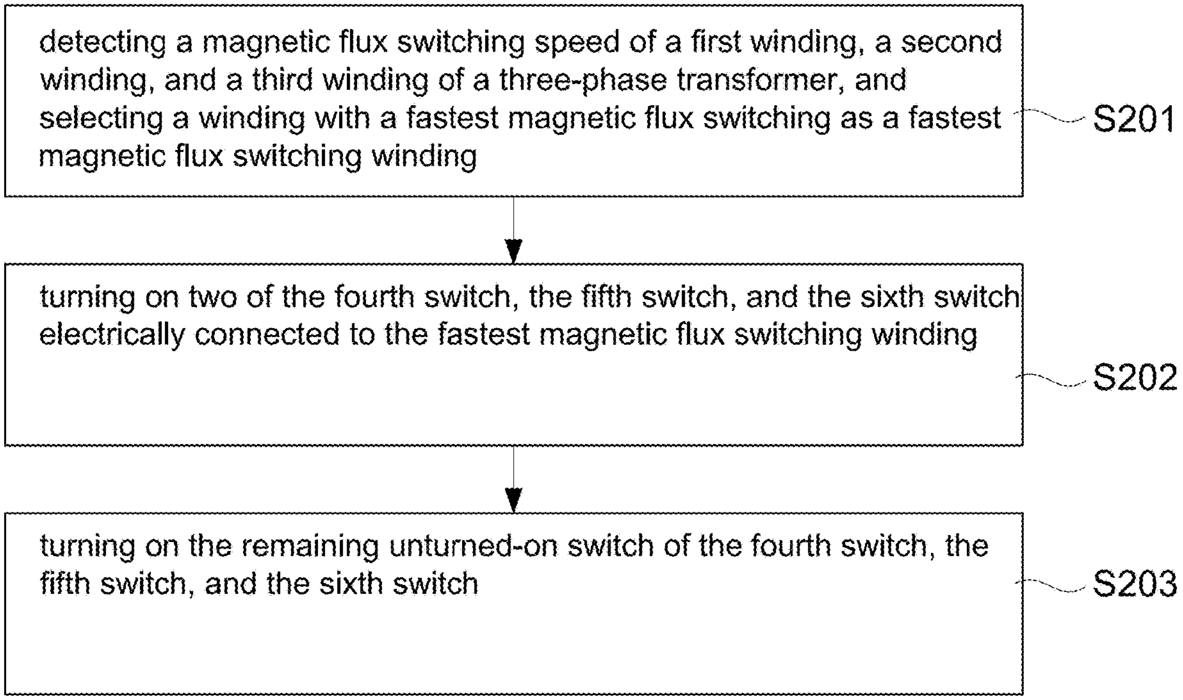
FIG. 8 is a flowchart of the forced commutation of the three-phase three-wire power switching system according to the present disclosure.

For the three-phase three-wire system, a preferred forced commutation procedure is provided, as shown in FIG. 8, and see FIG. 6 for coordination. The procedure includes steps of: first, detecting a magnetic flux switching speed of the first winding W12, the second winding W23, and the third winding W31 of the three-phase transformer 33, and selecting a winding with the fastest magnetic flux switching as a fastest magnetic flux switching winding after turning off the first switch 311, the second switch 312, and the third switch 313 connected to the main power supply S-pri (step S201). For example, but this does not limit the present disclosure, the first winding W12 is the fastest magnetic flux switching winding.

Afterward, turning on two of the fourth switch 321, the fifth switch 322, and the sixth switch 323 electrically connected to the fastest magnetic flux switching winding (step S202). If the first winding W12 is the fastest magnetic flux switching winding, the fourth switch 321 and the fifth switch 322 of the second power switch assembly 32 are turned on. Incidentally, if the second winding W23 is the fastest magnetic flux switching winding, the fifth switch 322 and the sixth switch 323 of the second power switch assembly 32 are turned on.

Finally, turning on the remaining unturned-on switch of the fourth switch 321, the fifth switch 322, and the sixth switch 323 (step S203). If the first winding W12 is the fastest magnetic flux switching winding, the remaining unturned-on sixth switch 323 is turned on. Incidentally, if the second winding W23 is the fastest magnetic flux switching winding, the remaining unturned-on fourth switch 321 is turned on.

Therefore, by evaluating and considering the allowance of forced commutation, the polarity of magnetic flux offset, and the polarity of voltage, the best timing for introducing forced commutation of thyristor can be achieved, effectively achieving the successful switching of the two power supplies.

Incidentally, the above explanation is implemented based on the example of "fastest magnetic flux switching". However, another embodiment of the present disclosure may also be implemented based on "maximum magnetic flux". Therefore, all such substitutions and modifications are intended to be embraced within the scope of the present disclosure as defined in the appended claims.

Figure 7:
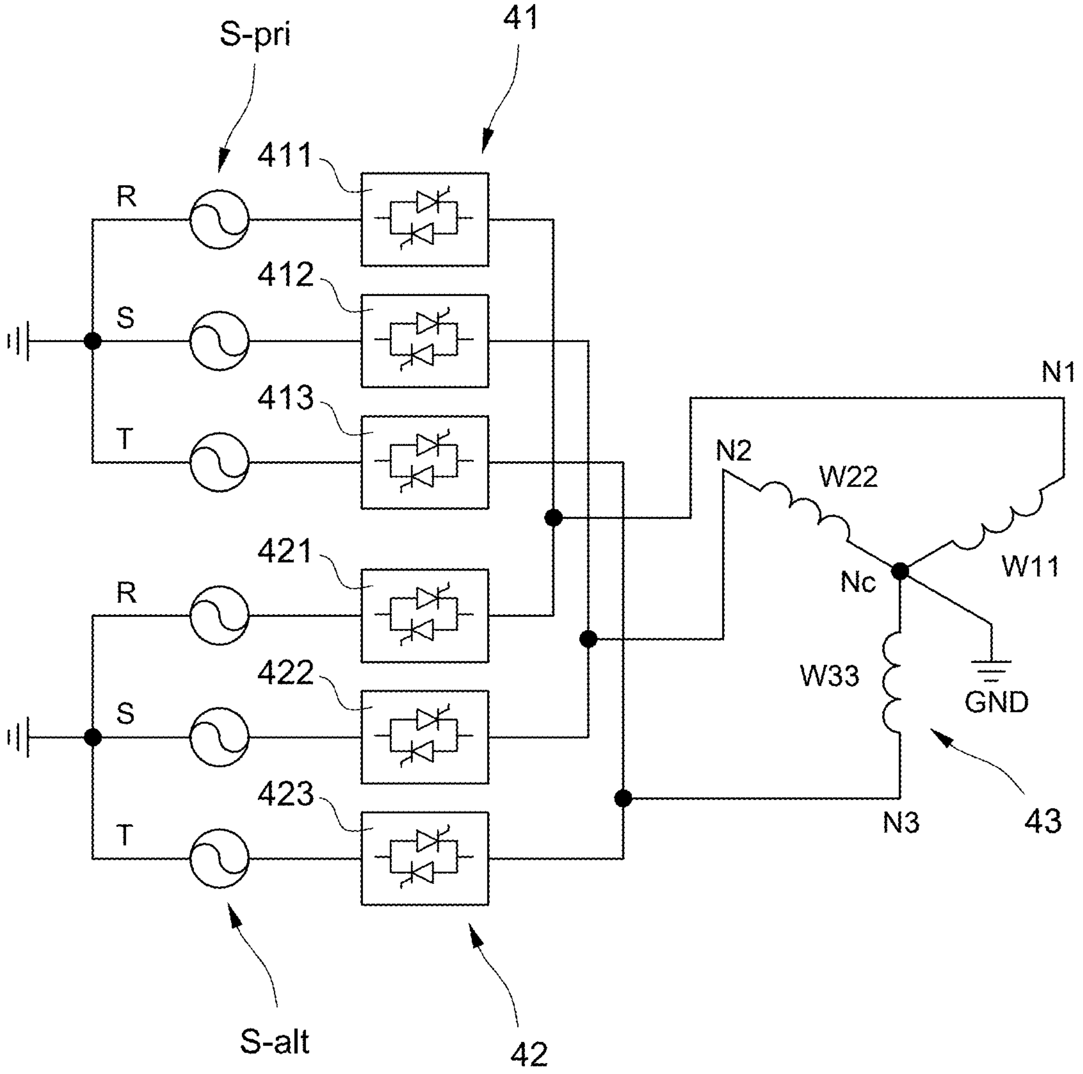
FIG. 7 is a block circuit diagram of a three-phase four-wire power switching system according to the present disclosure.

Please refer to FIG. 7, which shows a block circuit diagram of a three-phase four-wire power switching system according to the present disclosure. In FIG. 7, two power supplies, including the main power supply S-pri and the backup power supply S-alt, respectively provide their own three-phase static transfer switch devices 41, 42, and are then connected to the downstream three-phase transformer 43.

As shown in FIG. 7, the three-phase power switching system includes a first power supply S-pri having three-phase AC power and a second power supply S-alt having three-phase AC power. The power switching system includes a first power switch assembly 41 and a second power switch assembly 42. The first power switch assembly 41 includes a first switch 411, a second switch 412, and a third switch 413 sequentially connected to a first phase (R phase), a second phase (S phase), and a third phase (T phase) of the first power supply S-pri. The second power switch assembly 42 includes a fourth switch 421, a fifth switch 422, and a sixth switch 423 sequentially connected to a first phase (R phase), a second phase (S phase), and a third phase (T phase) of the second power supply S-alt.

The three-phase transformer 43 includes a first wining W11, a second winding W22, and a third winding W33. In particular, the first winding W11, the second winding W22, and the third winding W33 of the three-phase transformer 43 are connected in a wye structure to form a common node Nc and three nodes N1, N2, N3, and the common node Nc is connected to a ground GND. In particular, a first node N1 is connected to the first switch 411 and the fourth switch 421, a second node N2 is connected to the second switch 412 and the fifth switch 422, and a third node N3 is connected to the third switch 413 and the sixth switch 423.

Incidentally, for the three-phase four-wire system, there are common problems: 1. over-excitation problem; 2. passive excitation problem.

Regarding the over-excitation problem, it will not be discussed in detail. Regarding the passive excitation problem, for the three-phase four-wire system, when the forced commutation is introduced, it cannot turn on only two thyristors. Since once only two thyristors are connected, the third thyristor will be affected by the magnetic flux even if it is not turned on.

Therefore, in order to avoid the problems of the over-excitation and the passive excitation, the design of the present disclosure can effectively achieve a technical solution for successful switching between the two power supplies. When an abnormal event occurs in the main power supply S-pri, all thyristors connected to the main power supply S-pri are first turned off by controlling the gates of the thyristors. Afterward, an allowance (a ticket) of the forced commutation is acquired, and thyristors of one phase are turned on to avoid passive excitation. Afterward, wait for half a cycle, for example, if it is a positive half cycle, the thyristors of one phase in a next negative half cycle to complete the conduction of two thyristors of one phase.

The timing of the conduction of the thyristors of the last two phases is determined based on whether magnetic flux saturation will occur after the calculated future magnetic flux is added. If magnetic flux saturation occurs, it is to wait for the opportunity to conduct. If magnetic flux saturation does not occur, the conduction of four thyristors of the remaining two phases will be completed in sequence.

Figure 9:
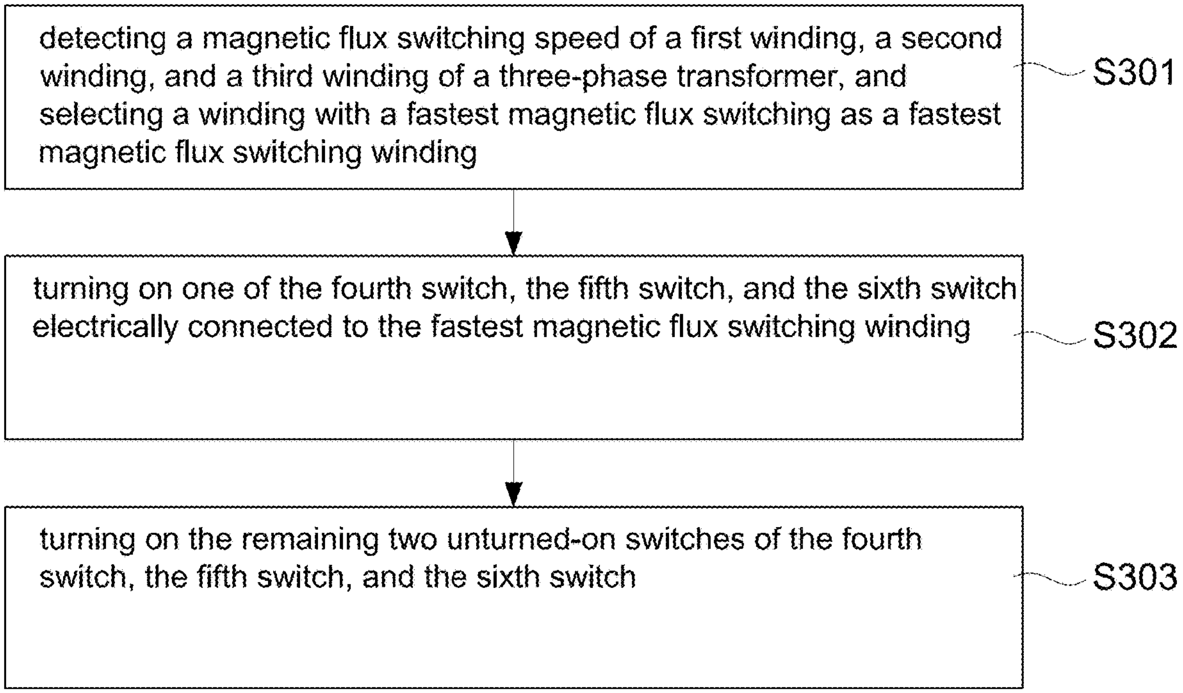
FIG. 9 is a flowchart of the forced commutation of the three-phase four-wire power switching system according to the present disclosure.

For the three-phase four-wire system, a preferred forced commutation procedure is provided, as shown in FIG. 9, and see FIG. 7 for coordination. The procedure includes steps of: first, detecting a magnetic flux switching speed of the first winding W11, the second winding W22, and the third winding W33 of the three-phase transformer 43, and selecting a winding with the fastest magnetic flux switching as a fastest magnetic flux switching winding after turning off the first switch 411, the second switch 412, and the third switch 413 connected to the main power supply S-pri (step S301). For example, but this does not limit the present disclosure, the first winding W11 is the fastest magnetic flux switching winding.

Afterward, turning on one of the fourth switch 421, the fifth switch 422, and the sixth switch 423 electrically connected to the fastest magnetic flux switching winding (step S302). If the first winding W11 is the fastest magnetic flux switching winding, the fourth switch 421 of the second power switch assembly 42 are turned on. Incidentally, if the second winding W22 is the fastest magnetic flux switching winding, the fifth switch 422 of the second power switch assembly 42 are turned on.

Finally, turning on the remaining two unturned-on switches of the fourth switch 421, the fifth switch 422, and the sixth switch 423 (step S303). If the first winding W11 is the fastest magnetic flux switching winding, the remaining unturned-on fifth switch 422 and sixth switch 423 are turned on. Incidentally, if the second winding W22 is the fastest magnetic flux switching winding, the remaining unturned-on fourth switch 421 and sixth switch 423 are turned on.

Therefore, by evaluating and considering the allowance of forced commutation, the polarity of magnetic flux offset, and the polarity of voltage, the best timing for introducing forced commutation of thyristor can be achieved, effectively achieving the successful switching of the two power supplies.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A power switching system comprising a first power supply and a second power supply with three-phase AC power, the power switching system comprising:

a first power switch assembly comprising a first switch, a second switch, and a third switch, sequentially connected to a first phase, a second phase, and a third phase of the first power supply, a second power switch assembly comprising a fourth switch, a fifth switch, and a sixth switch, sequentially connected to a first phase, a second phase, and a third phase of the second power supply, and a three-phase transformer comprising a first winding, a second winding, and a third winding, wherein the first winding, the second winding, and the third winding of the three-phase transformer are connected in a delta structure to form three common nodes, wherein a first common node is connected to the first switch and the fourth switch, a second common node is connected to the second switch and the fifth switch, and a third common node is connected to the third switch and the sixth switch, wherein the power switching system is configured to provide a forced commutation procedure for switching the first power supply to the second power supply, comprising:

turning off the first switch, the second switch, and the third switch connected to the first power supply, detecting magnetic flux of the first winding, the second winding, and the third winding, and selecting one winding with the fastest flux switching as a fastest flux switching winding, turning on two of the fourth switch, the fifth switch, and the sixth switch connected to the fastest flux switching winding, and turning on the remaining one of the fourth switch, the fifth switch, and the sixth switch.

2. The power switching system as claimed in claim 1, wherein any one of the first switch, the second switch, and the third switch comprises two thyristors connected in anti-parallel; any one of the fourth switch, the fifth switch, and the sixth switch comprises two thyristors connected in anti-parallel.

3. The power switching system as claimed in claim 2, wherein the first power supply is to be switched to the second power supply and in the forced commutation procedure, when it is determined that a current flowing out the first power supply is greater than zero, it is further determined whether a voltage of the second power supply is greater than a load voltage.

4. The power switching system as claimed in claim 3, wherein when the voltage of the second power supply is greater than the load voltage, a controller, by turning on the thyristor connected to the second power supply and is forward-biased according to the voltage, inversely excites the thyristor connected to the first power supply that has not been completely turned off, and completely turns the thyristor off.

5. The power switching system as claimed in claim 2, wherein the first power supply is to be switched to the second power supply and in the forced commutation procedure, when it is determined that a current flowing out the first power supply is less than zero, it is further determined whether a voltage of the second power supply is less than a load voltage.

6. The power switching system as claimed in claim 5, wherein when the voltage of the second power supply is less than the load voltage, a controller, by turning on the thyristor connected to the second power supply and is forward-biased according to the load voltage, causes a current change effect to force the thyristor connected to the first power supply that has not been completely turned off to be completely turned off.

7. The power switching system as claimed in claim 2, wherein the first power supply is to be switched to the second power supply and in the forced commutation procedure, when it is determined that a voltage difference between a voltage of the second power supply and a load voltage is greater than a voltage threshold, it indicates that the thyristor connected to the first power supply has been turned off.

8. The power switching system as claimed in claim 2, wherein when a polarity of magnetic flux offset is the same as a polarity of the voltage and no magnetic flux saturation occurs, a forced commutation of the thyristor is introduced.

9. The power switching system as claimed in claim 2, wherein when a polarity of magnetic flux offset is different from a polarity of the voltage, the forced commutation of the thyristor is immediately introduced.

10. A power switching system comprising a first power supply and a second power supply with three-phase AC power, the power switching system comprising:

a first power switch assembly comprising a first switch, a second switch, and a third switch, sequentially connected to a first phase, a second phase, and a third phase of the first power supply, a second power switch assembly comprising a fourth switch, a fifth switch, and a sixth switch, sequentially connected to a first phase, a second phase, and a third phase of the second power supply, and a three-phase transformer comprising a first winding, a second winding, and a third winding, wherein the first winding, the second winding, and the third winding of the three-phase transformer are connected in a wye structure to form one common node and three nodes, and the common node is grounded, wherein a first node is connected to the first switch and the fourth switch, a second node is connected to the second switch and the fifth switch, and a third node is connected to the third switch and the sixth switch, wherein the power switching system is configured to provide a forced commutation procedure for switching the first power supply to the second power supply, comprising:

turning off the first switch, the second switch, and the third switch connected to the first power supply, detecting magnetic flux of the first winding, the second winding, and the third winding, and selecting one winding with the fastest flux switching as a fastest flux switching winding, turning on one of the fourth switch, the fifth switch, and the sixth switch connected to the fastest flux switching winding, and turning on the remaining two of the fourth switch, the fifth switch, and the sixth switch.

11. The power switching system as claimed in claim 10, wherein any one of the first switch, the second switch, and the third switch comprises two thyristors connected in anti-parallel; any one of the fourth switch, the fifth switch, and the sixth switch comprises two thyristors connected in anti-parallel.

12. The power switching system as claimed in claim 11, wherein the first power supply is to be switched to the second power supply and in the forced commutation procedure, when it is determined that a current flowing out the first power supply is greater than zero, it is further determined whether a voltage of the second power supply is greater than a load voltage.

13. The power switching system as claimed in claim 12, wherein when the voltage of the second power supply is greater than the load voltage, a controller, by turning on the thyristor connected to the second power supply and is forward-biased according to the voltage, inversely excites the thyristor connected to the first power supply that has not been completely turned off, and completely turns the thyristor off.

14. The power switching system as claimed in claim 11, wherein the first power supply is to be switched to the second power supply and in the forced commutation procedure, when it is determined that a current flowing out the first power supply is less than zero, it is further determined whether a voltage of the second power supply is less than a load voltage.

15. The power switching system as claimed in claim 14, wherein when the voltage of the second power supply is less than the load voltage, a controller, by turning on the thyristor connected to the second power supply and is forward-biased according to the load voltage, causes a current change effect to force the thyristor connected to the first power supply that has not been completely turned off to be completely turned off.

16. The power switching system as claimed in claim 11, wherein the first power supply is to be switched to the second power supply and in the forced commutation procedure, when it is determined that a voltage difference between a voltage of the second power supply and a load voltage is greater than a voltage threshold, it indicates that the thyristor connected to the first power supply has been turned off.

17. The power switching system as claimed in claim 11, wherein when a polarity of magnetic flux offset is the same as a polarity of the voltage and no magnetic flux saturation occurs, a forced commutation of the thyristor is introduced.

18. The power switching system as claimed in claim 11, wherein when a polarity of magnetic flux offset is different from a polarity of the voltage, the forced commutation of the thyristor is immediately introduced.

* * * * *